(12) United States Patent
Liao

(10) Patent No.: US 7,054,315 B2
(45) Date of Patent: May 30, 2006

(54) EFFICIENCY MASKED MATCHING

(75) Inventor: Heng Liao, Burnaby (CA)

(73) Assignee: PMC-Sierra Ltd., Burnaby (CA)

( * ) Notice: Subject to any disclaimer, the term of this patent is extended or adjusted under 35 U.S.C. 154(b) by 1020 days.

(21) Appl. No.: 09/953,215

(22) Filed: Sep. 17, 2001

(65) Prior Publication Data

US 2003/0123459 A1   Jul. 3, 2003

(51) Int. Cl.
    *H04L 12/28* (2006.01)

(52) U.S. Cl. .......................... 370/392; 370/351; 707/3

(58) Field of Classification Search ............... 370/351, 370/389, 392, 400–401; 707/101–103; 709/238–242
    See application file for complete search history.

(56) References Cited

U.S. PATENT DOCUMENTS

| 5,956,721 | A | | 9/1999 | Douceur et al. | |
| 5,995,971 | A | | 11/1999 | Douceur et al. | |
| 6,289,013 | B1 | * | 9/2001 | Lakshman et al. | 370/389 |
| 6,341,130 | B1 | * | 1/2002 | Lakshman et al. | 370/389 |
| 6,560,610 | B1 | * | 5/2003 | Eatherton et al. | 707/104.1 |

OTHER PUBLICATIONS

A Search Algorithm for Table Entries with Non-contiguous Wildcarding, downloaded at http://citeseer.ist.psu.edu/tsuchiya91search.html, pp. 1-10, 1991.*
"The Art of Computer Programming, vol. 3, Sorting and Searching", pp. 490-499, 1973, Knuth.
"Packet Classification on Multiple fields", Computer Systems Laboratory, Stanford University, pp. 147-160, Pankaj Gupta et al.
"High-Speed Policy-based Packet Forwarding Using Efficient Multi-dimensional Range Matching" Laksshman, pp. 203-214.
"Fast and Scalable Layer Four switching", pp. 191-202, Srinivasan et al.
"Classifying Packets with Hierarchical Intelligent Cuttings" Stanford University, pp. 34-41, Gupta et al.

* cited by examiner

*Primary Examiner*—Frank Duong
(74) *Attorney, Agent, or Firm*—Curtis B. Behmann; Borden Ladner Gervais LLP

(57) ABSTRACT

Methods and apparatus for reducing the search space processed by mask matching methods. The search space is reduced by grouping the candidate bit patterns into groups and subgroups that have internal bit agreement between the members. By only applying the mask matching methods to a select number of groups selected by their bit agreement with the target bit pattern, the computation time and memory requirement of the mask matching method is reduced.

5 Claims, 10 Drawing Sheets

EFFICIENCY MASKED MATCHING

FIELD OF THE INVENTION

The present invention relates to methods and apparatus for matching a target bit pattern with a multitude of candidate bit patterns and, more specifically, to methods which will enhance the efficiency of such methods.

BACKGROUND OF THE INVENTION

In data networks, routers classify data packets to determine the micro-flows that the packets belong to and then apply the classification to the packets accordingly. Flow identification is the essential first step for providing any flow dependent service. A number of network services require packet classification including access-control, firewalls, policy-based routing, provision of integrated/differentiated qualities of service, traffic billing, and secure tunnelling. In each application, the classifier determines which micro-flow an arriving packet belongs to so as to determine whether to forward or filter, where to forward it to, what class of service it should receive, the scheduling tag/state/parameter that it is associated with, or how much should be charged for transporting it. The classifier maintains a set of rules about packet headers for flow classification.

To clarify, a router is multi-port network device that can receive and transmit data packets from/to each port simultaneously. Data packets typically have a regular format with a uniform header structure. The header structure usually contains data fields such as address, or packet type. When a packet is received from a port, the router uses the header information to determine whether a packet is discarded, logged, or forwarded. If a packet is forwarded, then the router also calculates which output port the packet will be going to. The router also accounts for the number of each type of packet passing by. The forwarding decision (where to send the packet) is typically made based on the destination address carried in the packet. In an Internet Protocol Router, forwarding involves a lookup process called the Longest Prefix Match (LPM) that is a special case of the general mask matching process.

The LPM uses a route table that maps a prefix rule (a mask-matching rule with all the wildcard bits located at the contiguous least significant bits) to an output port ID. An example of an LPM route table is given below:

| # | 32-bit Prefix | | | | | | | | Output PortID |
|---|------|------|------|------|------|------|------|------|--------|
| 1 | xxxx | xxxx | xxxx | xxxx | xxxx | xxxx | xxxx | xxxx | port 0 |
| 2 | 1111 | 0010 | 1100 | xxxx | xxxx | xxxx | xxxx | xxxx | port 1 |
| 3 | 1101 | 0011 | 0001 | xxxx | xxxx | xxxx | xxxx | xxxx | port 3 |
| 4 | 1111 | 0010 | 1100 | 1100 | 0011 | xxxx | xxxx | xxxx | port 2 |
| 5 | 0010 | 0000 | 0001 | 1111 | 1111 | 0000 | 1101 | 0000 | port 4 | where x is a wild card bit.

An input packet with destination address="1111 0010 1100 1100 0011 1111 1111 1111" should be forwarded to port 2 because it matches entry #2 and #4, but #4 has priority over #2 because the prefix length (number of non-wildcard bits) of #4 is longer than #2.

The router or a firewall will also examine the input packets to determine if they should be discarded and logged. This is usually done with an Access Control List (ACL) Lookup. An ACL can be a user configurable mask-matching rule set (based on packet header fields) that categorizes certain types of traffic that may be hazardous to the network. Hence, when a packet that matches an ACL entry is received, the router/firewall should take action according to the ACL to discard and log the packet or alarm the network administrator.

Such devices as explained above use general multi-layer classification methods in carrying out the device's function. General multi-layer classification requires the examination of arbitrary data/control fields in multiple protocol layers. The prior art grammatical/lexical parser provides flexible solutions to this problem, but the cost of supporting a large rule set is high.

A multiple field classifier is a simple form of classifier that relies on a number of fixed fields in a packet header. A classic example is the 7-dimensional classification, which examines the SA/DA/TOS/Protocol in the IP header, and the SPORT/DPORT/PROTOCOL_FLAG in the TCP/UDP header. Because a multi-field classifier deals with fixed fields, parsing is not required. Instead of dealing with variable length packets, the multi-field classifier does classification on fixed sized search keys. The search key is a data structure of the extracted packet data fields. The Multi-field classifier assumes the search keys are extracted from the packet before being presented to the classifier.

The problem of multiple field classification can be transformed into the problem of condition matching in multi-dimensional search key space, where each dimension represents one of the data fields the classifier needs to examine. A classification rule specifies conditions to be matched in all dimensions.

The classification rules specify value requirements on several fixed common data fields. Previous study shows that a majority of existing applications require up to 8 fields to be specified: source/destination Network-layer address (32-bit for Ipv4), source/destination Transport-layer port numbers (16-bit for TCP and UDP), Type-of-service (TOS) field (8-bits), Protocol field (8-bits), and Transport-Layer protocol flags (8-bits) with a total of 120 bits. The number of fields and total width of the fields may increase for future applications.

Rules can be represented in a number of ways including exact number match, prefix match, range match, and wildcard match. Wildcard match was chosen to be the only method of rule representation that did not sacrifice generality. Any other forms of matching are translated into one or multiple wildcard match rules. A wild card match rule is defined as a ternary string, where each bit can take one of three possible values: '1', '0', or 'x'. A bit of '1' or '0' in the rule requires the matching search key bit in the corresponding position to have exactly the same value, and a bit of 'x' bit in the rule can match either '0' or '1' in the search key.

An example of a rule specification on a 16-bit field is given below:

The classifier wants to match 1111 0000 xx1x 0xx1

The mask is:

1111 1111 0010 1001

The target value is:

1111 0000 0010 0001

Prefix match rules can be represented in wildcard rules naturally by contiguous 'x' bits in the rules. However the don't-care bits in a general wildcard do not have to be contiguous. Ranges or multiple disjoint point values may be defined by using multiple masked matching rules. For example, an 8-bit range must be broken into two masked matching rules '00010xxx' and '00110xx'. Even with this limitation, the masked matching form is still considered to be an efficient representation, because most of the ranges in use can be broken down into a small number of mask rules. A compiler can handle the task of breaking down user rule specification in a convenient syntax, therefore the complexity can be hidden from the user.

Each rule represents a region in the multi-dimensional space. Each search key (representing a packet to be classified) defines a point in this space. Points that fall into one region are classified as a member of the associated class. Ambiguity arises when multiple regions overlap each other. A single priority order is defined among the rules to resolve the ambiguity. The rules are numbered from 0 to N−1. The rule indices define the priority among the rules in ascending order. The region with higher priority will cover the region with lower priority. In other words, if a packet satisfies both rule[i], and rule[j], if i<j, it is classified into class[i], otherwise into class[j].

One advantage of mask matching is its dimension independence. Multiple fields concatenated can be classified with the same method as if they were one wide field. This is accomplished by concatenating the masks of the target strings.

The prior solutions can be grouped into the following categories:

Sequential Match

For each arriving packet, this approach evaluates each rule sequentially until a rule is found that matches all the fields of the search key. While this approach is simple and efficient in use of memory (memory size grows linearly as the size of the rule set increases), this approach is unsuitable for high-speed implementation. The time required to perform a lookup grows linearly with rule set size.

Grid of Tries

The 'Grid of Tries' (or Tuple Space Search) uses an extension of tries data structure to support two fields per search key. This is a good solution for a two-dimensional rule set. But it is not easy to extend the concept to more fields.

The cross-producing scheme is an extension of the 'Grid of Tries' that requires a linear search of the database to find the best matching filter. Hence the effectiveness of crossproducing is not clear. The grid of tries approach requires intensive precompute time. The rule update speed is slow.

A scheme based on tries is presented by Douceur et al. in U.S. Pat. Nos. 5,995,971 and 5,956,721. This method utilizes a tri-indexed hierarchy forest ("Rhizome") that accommodates wildcards for retrieving, given a specific input key, a pattern stored in the forest that is identical to or subsumes the key. This approach has the weakness of not supporting "conflict" between patterns (as stated in line 21~26, column 22 of U.S. Pat. No. 5,995,971). Patterns that partially overlap but do not subsume one another (E.g. pattern "100x" and "1x00") are in "conflict" because they overlap each other partially, may not be stored in the rhizome defined by the patent, since no defined hierarchical relationship holds for these patterns. In networking applications, these conflicts widely exist in router access list and firewall policies. This weakness limits the use of this classification scheme.

Concurrent Cross Producing

T. V. Lakshman in "High Speed Policy-Based Packet Forwarding Using Efficient Multi-Dimensional range Matching", Proceedings of ACM SIGCOMM'98 Conference, September, 1998, presented a hardware mechanism for concurrent matching of multiple fields. For each dimensional matching this scheme does a binary search on projections of regions on each dimension to find the best match region. A bit-level parallelism scheme is used to solve the crossproducing problem among dimensions. The memory size required by this scheme grows quadratically and memory bandwidth grows linearly with the size of the rule set. Because of the computation complexity in the crossproducing operation, this scheme has a poor scaling property. This scheme also requires a time consuming data structure generation process, hence the rule update speed is slow.

Ternary CAM

Hardware Ternary CAMs (Content Addressed Memory) can be used for classification. Ternary CAMs store three value digits: '0', '1' or 'X' (wildcard). The CAMs have good look-up performance, and fast rule update time. But the hardware cost (silicon area) and power consumption are high. More over, the CAMs require full-custom physical design that prevents easy migration between different IC technologies. For these reasons, currently available CAMs are typically small.

Recursive Flow Classification

The recursive flow classifier (RFC) as discussed in Pankaj Gupta and Nick Mckeown, "Packet Classification on Multiple Fields", Sigcomm, September 1999, Harvard University and Pankaj Gupta and Nick Mckeown, "Packet Classification using Hierarchal Intelligent Cuttings", Proc. Hot Interconnects VII, August 99, Stanford, exploits the heuristics in typical router policy database structure(router microflow classifier, access list, fireware rules). RFC uses multiple reduction phases; each step consisting of a set of parallel memory lookups. Each lookup is a reduction in the sense that the value returned by the memory lookup is shorter (is expressed in fewer bits) than the index of the memory access. The algorithm can support very high lookup speed at relatively low memory bandwidth requirement. Since it relies on the policy database structure, in the worst case, little reduction can be achieved at each step. Hence the performance becomes indeterministic. In a normal case, the lookup performance gain is achieved at the cost of high memory size and very long precomputation time. For a large ruleset (16K), the RFC precompute time exceeds the practical limit of a few seconds. In general, RFC is suitable for small classifiers with static rules.

All of the above methods involve, in one form or another, large computation or lookup times. Whichever method is implemented, the cost in time and complexity eventually increases to unacceptable levels. Furthermore, whichever method is used, the whole search space of possible candidate bit patterns is searched for a match with the target bit patterns. What is required is a method which reduces the search space for whichever mask matching method is implemented.

SUMMARY OF THE INVENTION

The present invention meets the above need by providing methods and apparatus for reducing the search space processed by mask matching methods. The search space is reduced by grouping the candidate bit patterns into groups and subgroups that have internal bit agreement between the members. By only applying the mask matching methods to a select number of groups selected by their bit agreement with the target bit pattern, the computation time and memory requirement of the mask matching method is reduced.

In a first aspect the present invention provides a method of increasing the efficiency of a process for finding a match between a target bit pattern and at least one of a plurality of candidate bit patterns, the method comprising dividing said candidate bit patterns into specific groups such that for every group, members of that group have bit agreement with every other member in said group, and applying said process only to groups whose members have bit agreement with said target bit pattern.

In a second aspect the present invention provides a method of increasing the efficiency of a process for finding a match between a target bit pattern and at least one of a plurality of candidate bit patterns, the method comprising dividing said candidate bit pattern into search space groups, each group having an aggregate number of members lesser than the total aggregate number of candidate bit patterns and applying said process only to groups whose members are in bit agreement with the target bit pattern on at least a first bit position.

In a third aspect, the present invention provides a method of increasing the efficiency of a process for finding a match between a target bit pattern and at least one of a plurality of candidate bit patterns, the method comprising grouping said candidate bit patterns based on a value of at least one specific bit position of said candidate bit patterns whose value of said at least one specific bit position does not match a value of said target bit pattern.

In a fourth aspect, the present invention provides a method of increasing the efficiency of a process for finding a match between a target bit pattern and at least one of a plurality of candidate bit patterns, the method comprising:
  a) grouping said candidate bit patterns based on a value of a specific bit in a specific bit position in said candidate bit patterns;
  b) discarding candidate bit patterns which have a specific bit in the specific bit position whose value does not match the value of the corresponding bit in the target bit pattern;
  c) repeating steps a)–b) to the remaining candidate bit patterns with different bit positions until the number of remaining candidate bit patterns is at a minimum; and
  d) applying said process to the remaining candidate bit patterns.

BRIEF INTRODUCTION TO THE DRAWINGS

A better understanding of the invention will be obtained by a consideration of the detailed description below, in conjunction with the following drawings, in which.

DETAILED DESCRIPTION OF THE PREFERRED EMBODIMENT

Figure 1:
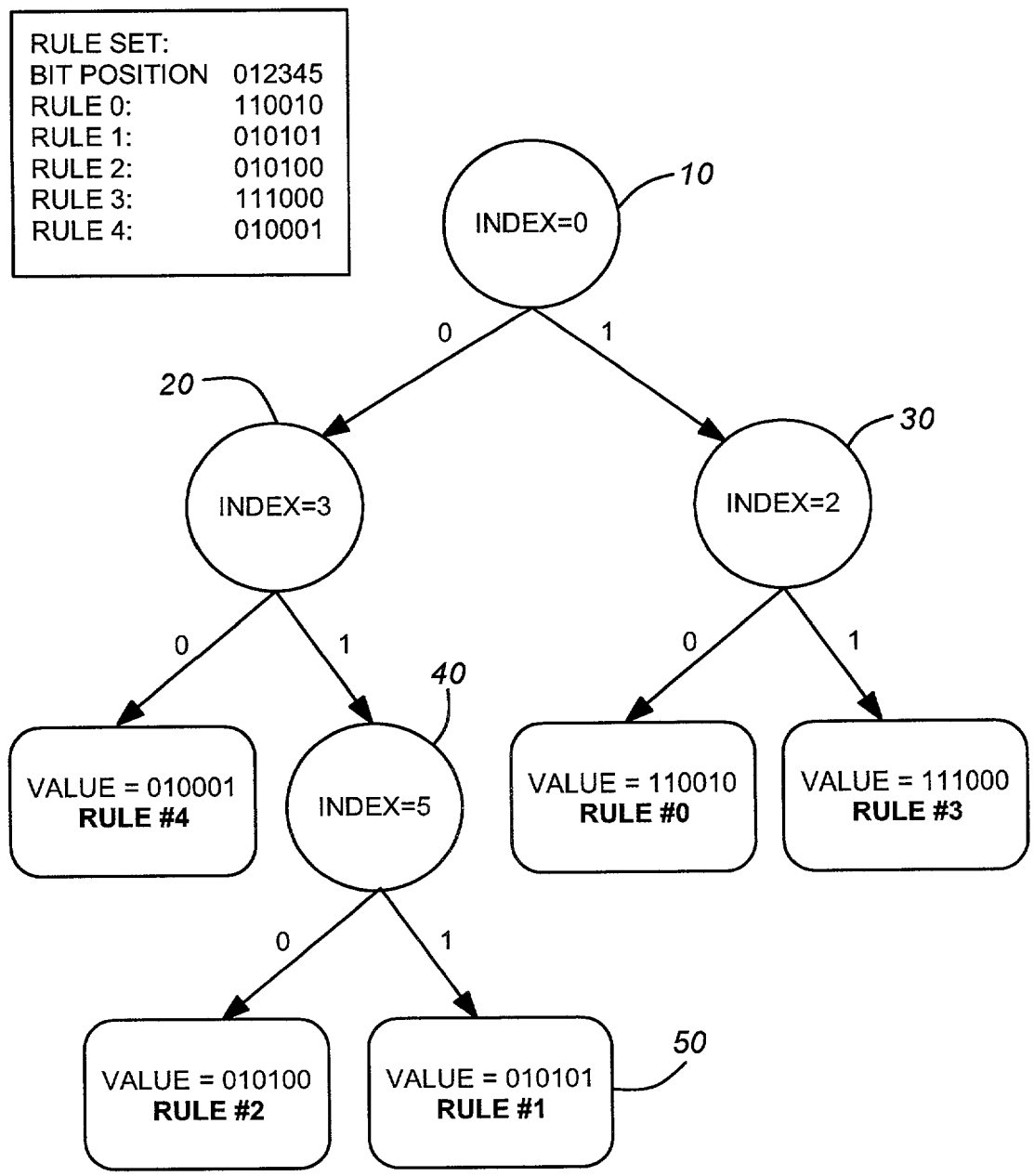
FIG. 1 illustrates a Patricia tree data structure according to the prior art.

To clarify the terminology used in this description the following definitions are provided:

Bit Position: a bit position is the placement of a specific bit in a bit pattern. Thus, if a bit pattern is 10XX1011, then the bit positions and their values are as follows (counting from the left):
  Bit position 0:1
  Bit position 1:0
  Bit position 2:X
  Bit position 3:X
  Bit position 4:1
  Bit position 5:0
  Bit position 6:1
  Bit position 7:1

From the above, it should be therefore be clear that bit position 2 is subsequent to or higher than bit position 1. Concurrently, bit position 4 is prior to or lower than bit positions 5, 6, and 7. Clearly, such relative positioning is dependent on a starting bit position from which relative positioning is determined. The above assumes a starting bit position of 0. However, there is nothing preventing bit position 7 from being the starting bit position. In this case, bit position 5 will be prior to bit position 4 and bit position 1 will be subsequent to bit position 2.

Filter: A filter defines a mask-matching rule. The method below assumes that a filter contains W bits and forms a concatenation of all the fields at which the classifier needs to look. A filter is further defined as a W-bit 3-value rule set. Each bit can take the value of either '1', '0', or 'x', which means that the bit needs to be 1, 0, or don't-care (x) to match this filter. Each rule can also be termed a filter bit.

Rule Set: A rule set is a collection of N filter rules indexed from 1 to N. The rule set defines a single order of priority. A rule with larger index value has higher priority than a rule with a smaller index. The symbols F[0] . . . F[N−1] are used to represent filters 0 . . . N. A rule set can be represented by the 3-value matrix F[N,W], where F[i,j] means the mask matching value of rule i bit j. Members of a rule set are also termed candidate bit patterns.

Field Vector: The packet field data to be classified. It is W-bit 2-value vector (either '0' or '1') that is the concatenation of the key fields of a data packet. The field vector is represented by the symbol K[0 . . . W−1]. This is also termed as a target bit pattern.

Bit agreement: the concept of a bit agreement is analogous to the idea of matching. A bit value of '1' agrees only with another bit value of '1'. A bit value of '0' does not agree with a bit value of '1' but does so with a bit value of '0'. A bit value of 'x' agrees with all bit values. Thus, a bit pattern of 101X10X is in bit agreement with both 1011101 and 1010101, but not with 101111X. Similarly, a bit pattern of 10XX is in bit agreement with XX11 and with 1001 but not with 11XX. Bit agreement may be constrained to a specific bit position. Thus, bit pattern 10XX1 is in bit agreement with 10100 up to bit position 3 but not with respect to bit position 4. Similarly, bit pattern X1001 is in bit agreement with bit pattern 111XX only up to bit position 1 since at bit position 2 the respective bit values are not equal.

Patricia tree: A data structure that provides relatively fast retrieval, insertion and removal operations for a search database. A Patricia tree is a binary tree. Each internal node in this tree has exactly two branches and a bit index value. The tree is traversed starting at the root; when a given node is reached, movement can occur in either of two directions. Each leaf in the tree contains a data value. The numeric bit index of an internal node specifies the specific bit in an input key that governs movement from the node. If that bit has a one value, one branch is taken; else if it has a zero value, the other branch is taken, and so forth through successive nodes along the path until a leaf node is reached. While the bit index for any child is greater than that of its parent, the bit indices encountered along any such path need not be consecutive, merely ascending. A look-up operation on the Patricia tree involves following the branches progressively starting from the root until a leaf node is reached. A match is only considered to be found if the data value on the leaf node is equal to the search key. The manner in which nodes are interconnected from a Patricia tree and the values of their associated bit indices are strictly determined by the value that is to be stored in each leaf node and by, where disagreements occur starting at the root and continuing at each successively higher bit positions, among all such leaf values. Each internal node (and hence a bit index) specifies a bit position at which such a disagreement exists. The Patricia tree structure has been used to do exact bit vector matches and longest prefix matches.

As an example of a Patricia tree, FIG. 1 illustrates a Patricia tree with the following rule set:

|  | Bit position | | | | | |
| --- | --- | --- | --- | --- | --- | --- |
|  | 0 | 1 | 2 | 3 | 4 | 5 |
| Rule 0 | 1 | 1 | 0 | 0 | 1 | 0 |
| Rule 1 | 0 | 1 | 0 | 1 | 0 | 1 |
| Rule 2 | 0 | 1 | 0 | 1 | 0 | 0 |
| Rule 3 | 1 | 1 | 1 | 0 | 0 | 0 |
| Rule 4 | 0 | 1 | 0 | 0 | 0 | 1 |

In FIG. 1, the circles denote internal nodes while the rounded boxes denote leaf nodes. In the figure, the index relates to the bit position being examined. Thus, if a match for the target bit pattern 010101 is being searched for, the search starts with bit position 0 (also known as the starting bit position). At this bit position, if the target pattern has a value of 0 from internal node 10 the right hand branch is taken to internal node 30. It should be noted that internal nodes 20 and 30 only reference indices 2 and 3 since, for bit position 1, ALL the candidate bit patterns have the same value of '1'. Thus, bit position 1 is not a bit position through which the different patterns can be differentiated. This means that, for the candidate bit patterns that have a 0 in bit position 0, bit position 1 cannot be used to differentiate between them. Similarly, for the candidate bit patterns with a '1' in bit position 0, bit position 1 cannot be used to differentiate between them.

Returning to the search, the target pattern has a value of 1 at bit position 3. This means that internal node 40 is the next destination. Bit position 5 (index=5) can be used to differentiate between the two remaining candidate bit patterns. Since the target bit pattern has a value of '1' at bit position 5, then the right hand branch is taken, leading to leaf node 50 and a match.

While the above example illustrates the use of a Patricia tree for a most specific match or most specific pattern, this is its limitation—only very specific patterns can be found.

The present invention uses the concept of the Patricia tree to reduce the search space that needs to be searched for a match. The original concept of the Patricia tree can only represent exact match rules efficiently. Matching a rule with a wild card (an 'x' in a bit position) requires that the rule be fully expanded into exact match rules that cover the wild card space. Thus, a bit pattern having a single wild card will require 2 leaf nodes while a bit pattern with n wild cards will need $2^n$ leaf nodes to expand. The present invention extends the Patricia tree concept to "prune" or reduce the search space of wildcard rules. This pruned or reduced search space can then be searched for the proper match. Without pruning, all the candidate bit patterns (or rules) in the classifier database will have to be examined for each target bit pattern. By traversing the wild card Patricia key using the target bit pattern, a majority of the candidate data bit patterns can be eliminated, thereby significantly reducing the number of candidate bit patterns that have to be examined.

The wildcard Patricia tree has two types of nodes: internal nodes and leaf nodes. Each internal node has two descendants, and the leaf node has no descendants. Each internal node represents a branch-point to two different directions on which different pruning is done to the search space. The leaf node represents a Minimum Subset or MSS that cannot be pruned any further.

Figure 2:
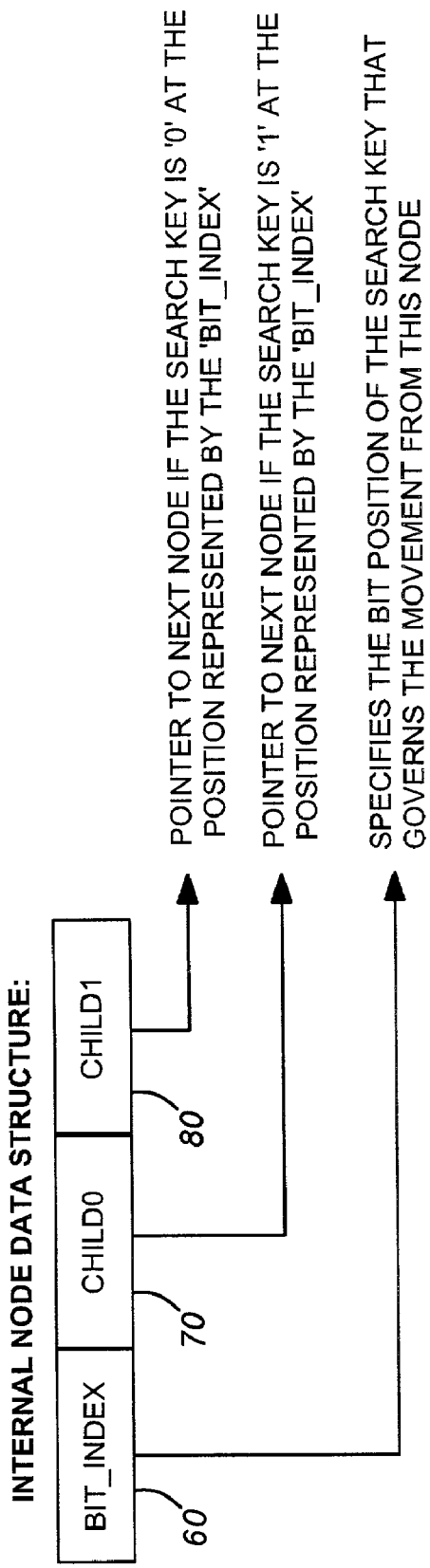
FIG. 2 is a block diagram illustrating a data structure for a leaf node in a modified Patricia tree according to an embodiment of the invention.

The data structures for the internal node is illustrated in FIG. 2. A bit index field 60 specifies the bit position to which the internal node refers while a child0 field 70 points to the next node if the bit position referenced by the bit index field 60 has a value of '0'. Similarly, a child1 field 80 points to the next node if the bit position referenced by the bit index field 60 has a value of '1'. It should be noted that there is no childX field as the target bit pattern is the pattern being matched when traversing the Patricia tree. Accordingly, there can be no X value as the target bit pattern only has definite '1' or '0' values in its bit positions.

Figure 3:
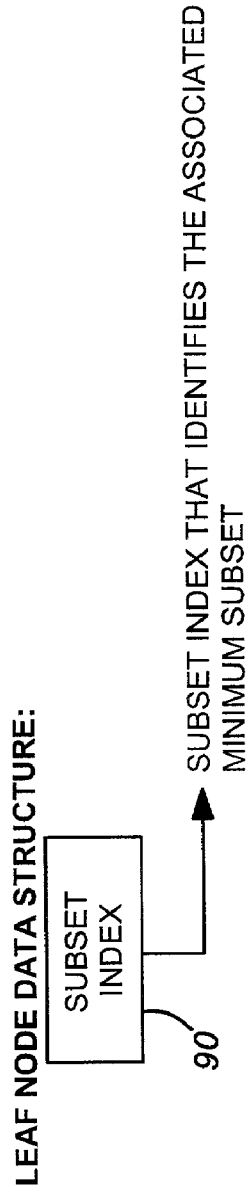
FIG. 3 is a block diagram illustrating data structure for a leaf node in a modified Patricia tree according to an embodiment of the invention.

Each leaf node points to a MSS of the rule database. The MSS's are stored separately in a data structure described in the next section. The data structure of the leaf node only contains a subset index that is used to identify the associated subset in the data structure. The data structure is illustrated in FIG. 3.

As can be seen, the leaf node 90 merely points to an index that references an associated minimum subset.

With a given wildcard rule set, the set can be turned into a Patricia tree and minimum subsets using the following method which is explained in C pseudo-code:

```
Node* Make_tree (Set rset, int index)
{   Set group0, group1, groupx;
    Node* p;
    P = new Node;
```

-continued

```
while (index <(KEY_WIDTH-1))
{
    group0 ←∅; group1 ←∅; groupx ←∅;
    for (j=0; j<sizeof(rset); j++)
        switch (rset.rule[j].bit[index])
        {
            case 0: group0←=group0 ∪ {rset.rule[j]};
            case 1: group1←=group1 ∪ {rset.rule[j]};
            case x: group0←=groupx ∪ {rset.rule[j]};
        }
    if ((group0 == ∅) || (group1 == ∅))//no disagreement
    found
    {
        index = index +1;
    }
    else
    {
        ptype = INTERNAL_NODE;
        p→bit_index = index;
        p→child0 = Make_tree ( (group0∪groupx), index+1);
        p→child1 = Make_tree ( (group1∪groupx), index+1);
        return p;
    }
}
p→type = LEAF_NODE;
p→subset_index = Create_new_minimum-subset(rset);
return p;
}
```

As can be seen, the Make_tree function is recursively applied to generate a tree and subtrees within the tree. In the initial pass, the pseudo-code groups the candidate bit patterns into three groups, group0 for those with 0 at the initial bit position, group1 for those with 1 at the initial bit position, and groupX for those with X at the initial bit position. Then, each of these groups are in turn subdivided into smaller groups based on the bit value at the bit position referenced by the continuously increasing index. The end result is that the final leaf nodes are subsets that have a member's candidate bit patterns that have bit agreements with each other. It should be noted that groupX is added to groups group0 and group1 prior to subdividing group0 and group1. This is done to account for the bit agreement between an 'X' value and a '0' or a '1' bit value.

In other words, the code starts with the complete rule set with index=0. At each step, the pseudocode finds the first bit position that is greater than or equal to the initial index value where a disagreement in bit value exist among the rules. Only the bit pair of '1' and '0' is considered to be a disagreement. A value of 'X' agrees with both '1' and '0'. The code finds bit disagreements by dividing the rule set (the reset argument of the Make_tree function) into three separate groups represented by group 0, group 1, and group X respectively for each index value incrementally. Grouping is done according to the bit value of each rule at the indexed bit position—if a rule has a 0 value at the indexed position, it is added to group 0 and so on. For a specific index value after the grouping is done, if both group 0 and group 1 are not empty, a bit disagreement exists for that index value. In this case an internal node is created. The internal node has two separate branches corresponding to bit values of 0 and 1. The Make_tree function is called to generate the subtrees for the 0-branch and the 1-branch. Note that the rule set for the 0-branch consists of both group 0 and group x, and the rule set for the 1-branch consists of group 1 and group x. In other words, groupx is duplicated for both branches since no pruning can be done for this group.

If the Make_tree function cannot find any bit disagreement for a rule set (i.e. after the index has been incremented beyond the key width), no further pruning on the set can be done. Therefore, a "leaf node" is created to represent the MSS.

Figure 4:
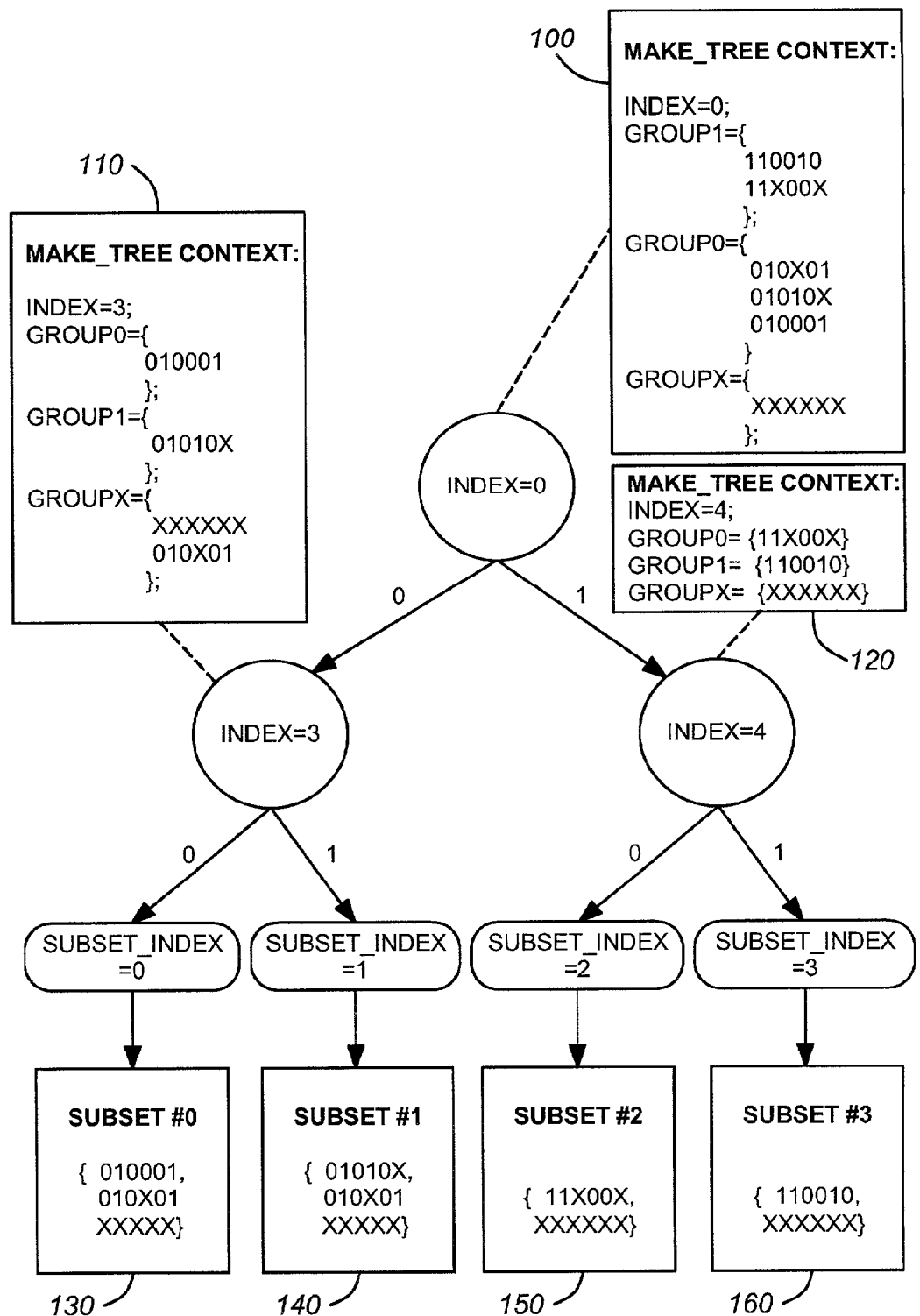
FIG. 4 illustrates a modified Patricia tree according to the invention and how it is constructed.

An example of the results of an application of the pseudocode is illustrated in FIG. 4. Given the rule set or candidate bit patterns in Table 1, the tree of FIG. 4 is produced.

TABLE 1

Rule set:

| | Bit position: | | | | | |
|---|---|---|---|---|---|---|
| | 0 | 1 | 2 | 3 | 4 | 5 |
| Rule 0 | 1 | 1 | 0 | 0 | 1 | 0 |
| Rule 1 | 0 | 1 | 0 | 1 | 0 | x |
| Rule 2 | 0 | 1 | 0 | x | 0 | 1 |
| Rule 3 | 1 | 1 | x | 0 | 0 | x |
| Rule 4 | 0 | 1 | 0 | 0 | 0 | 1 |
| Rule 5 | x | x | x | x | x | x |
| Rule 6 | 0 | 1 | 1 | x | x | x |

At the initial bit position (index=0) the candidate bit patterns are divided into 3 groups, group0, group1, and groupx, as shown in box 100. Each of group0 and group1 in box 100 is further subdivided into subgroups in box 110 and box 120 respectively. As can be seen, the initial group0 is subdivided using index=3 since index=1 for this group cannot be used to subdivide the group as there is bit agreement between all group members. Only when index=3 is there bit disagreement. These subgroups are shown in box 130 (for bit value=0 at bit position 3) and in box 140 (for bit value=1 at bit position 3). The initial group1 is subdivided (see box 120) using index=4. This is because, for this group1, indices 1, 2 and 3 cannot be used to subdivide as all of the group members have bit agreement until index=4.

The other subgroups derived from the rule set are shown in boxes 150 and 160. These subgroups result from the initial group having a bit value of '1' in the initial bit position. As can be seen, each one of these subgroups is indexed or referenced by a subset_index value. The subset_index value and the subset or subgroup members are as follows:

subset_index=0 [box 130]

{010001, 010X01, xxxxx} subset_index=1 [box 140]

{01010X, 010X01, xxxxx} subset_index=2 [box 150]

{11X00X, xxxxx} subset_index=3 [box 160]

{110010, xxxxx}

These subgroups can be reduced to a smaller number of what can be termed a physical set (PS) to which a mask matching method can be applied. While there are 4 MSS sets in the example, in practical applications there can be large numbers of such sets, with the number of elements in each set being quite varied. To simplify storage and sorting through what could be large numbers of MSS sets, these sets can be combined into physical sets referenced by a PS_index number. If this is done, a target bit pattern can then traverse the tree (effectively grouping the candidate bit patterns and "discarding" from consideration those bit patterns whose bit values at the relevant bit positions do not agree with the target bit pattern) to arrive at a PS_index number at the resulting leaf node. The PS_index number refers to a physical set which contains candidate bit patterns having a high probability of matching the target bit pattern. A mask matching process can then be applied to the physical set. Since the physical set is smaller in element numbers than the complete rule or candidate set, then the mask matching process becomes more efficient as it is only applied to a smaller set.

The above approach is even more practical if the mask matching process to be used or the hardware to be used can only support a fixed set of fixed size groups. Thus, given a list of MSS's and a group size limit of LIMIT, the MSS's have to be packed into physical sets having a size of, at most, LIMIT.

If an MSS group is of size LIMIT, then it cannot be packed into a physical set. It can become a physical set on its own. However, other MSS's of fixed size that are not full can be packed into physical sets, saving on the memory that would otherwise have to be allocated to the empty spots in the non-full MSS's Clearly, each MSS can not be larger than the mask matching process LIMIT, otherwise the MSS can not be fitted into the fixed size subsets supported. In practice, LIMIT should be made as large as possible within the physical constraints to relax this constraint as far as possible. The maximum size of the MSS actually determines the number of rules that can subsume or overlap any one rule in the set. From our study of typical IP classification rule sets, we have found that the maximum MSS size is quite small (<256). Hence, the limitation does not seriously impair the applicability of the invention.

The following C pseudo-code function illustrates how the MSS groups can be packed into physical sets:

```
Pack_MSS Packs a list of MSS's into a list of PS's.
Set Pack_MSS (Set LIST_MSS)
{
    Set LIST_PS;
    Set T;
        LIST_PS←ø;
        While (LIST_MSS not empty)
        {
            T←ø;
            For (each set MSS in LIST_MSS)
            {
                if (sizeof (TUMSS) <=LIMIT)
                {
                    T = TUMSS;
                    LIST_MSS = LIST_MSS - MSS;
                }
            }
            LIST_PS←LIST_PS ∪ {T};
        }
        return LIST_PS;
}
```

Note that memory savings may be achieved by the PACK_MSS function when multiple overlapping MSS's are merged into one PS—the overlapping rules appear only once in the merged PS set. A larger LIST_MSS allows more MSS's to be packed together, and hence the chances of getting memory savings is larger. This is another reason for using the largest practical LIMIT value. However, note that increasing LIMIT indefinitely is also not feasible, as it imposes a significant burden on the associative lookup process.

The PACK_MSS function not only generates a list of PS sets, but also establishes a mapping from MSS to PS. Each MSS is mapped into the PS that PACK—MSS packs it into. An index lookup table is generated to represent the mapping, so that one can find the associated PS from the MSS index.

Alternatively, the Patricia tree leaf node can store a pointer to the associated PS and save the indexed lookup processing step.

Figure 5:
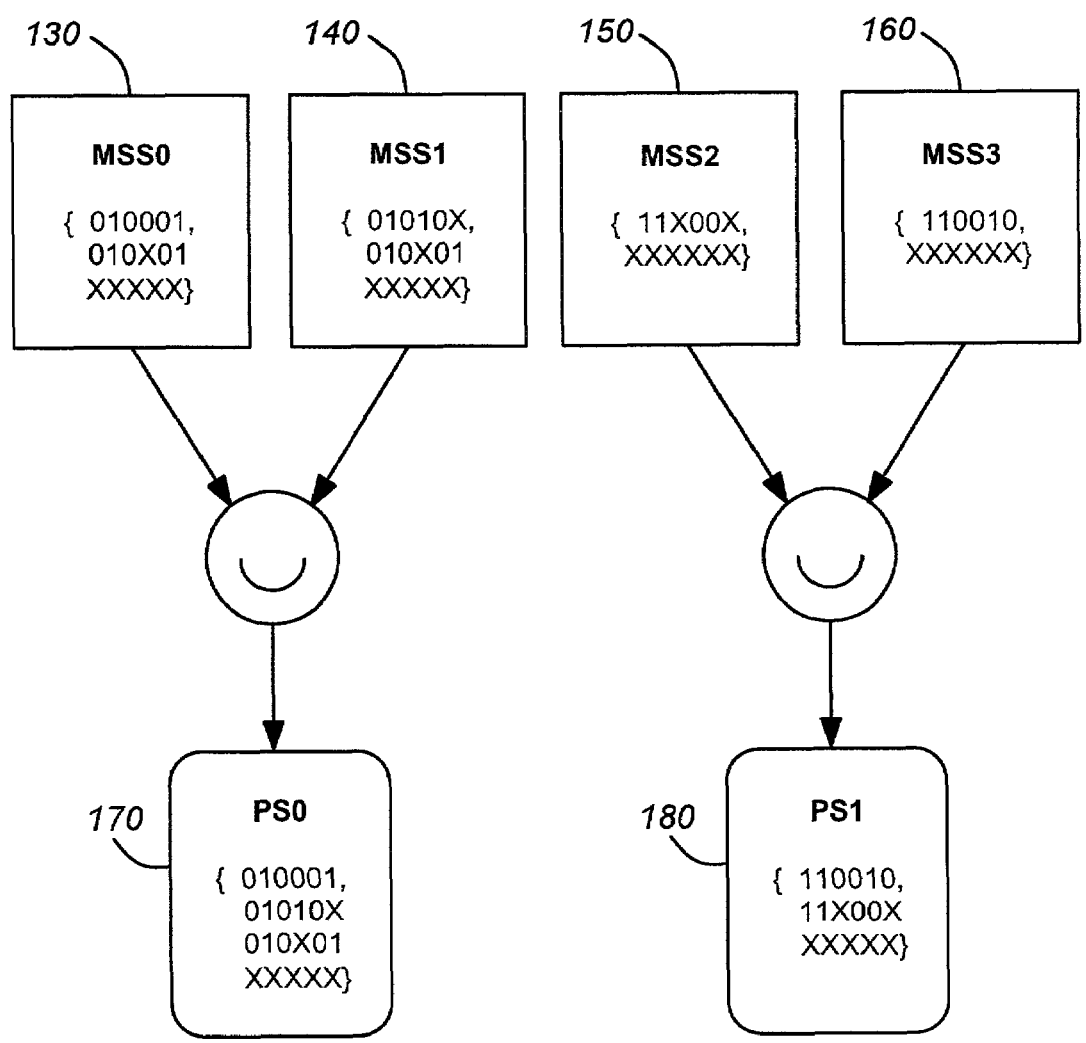
FIG. 5 is a block diagram illustrating how minimum search spaces can be combined to create a physical set.

FIG. 5 schematically illustrates what occurs when PACK_MSS is implemented. The subgroups in boxes 130, 140, 150, 160 (from FIG. 4) are packed into physical sets 170, 180. As can be seen, the subgroups in boxes 130, 140 are packed into physical set 170 (PS0) and elements or members common to the subgroups are only represented once in the physical set. The resulting physical set 170 from subgroups 130, 140 will thus have the members:

PSø

{010001, 01010x, 010x01, xxxxx}

Similarly, the subgroups in boxes 150, 160 are packed into physical set 180 (PS1) to result in:

PS1

{110010, 11x00x, xxxxx}

The example in FIG. 5 assumes LIMIT=4.

With the tree completed and the physical sets created, it can thus be determined if a given target bit pattern matches a candidate bit pattern. As noted above, the process essentially comprises of traversing the tree to "discard" the groups of candidate bit patterns which do not have bit agreement with the target bit pattern at specific bit positions. The tree traversal can be accomplished using the method of the C pseudo-code function below:

Tree_lookup traverses the Patricia tree to locate the corresponding PS.

```
Tree_Lookup (key, Node* tree)
{
if (tree→type = = INTERNAL_NODE)
    {
        switch (key[tree→bit_index])
        {
            case 0:PS_INDEX = Tree_lookup (key, tree→child0) ;break;
            case 1:PS_INDEX = Tree_lookup (key, tree→child1) ;break;
        }
    }
else    // LEAF_NODE
    {
        MSS_INDEX = p→subset_index;
        PS_INDEX = MSS2PS_MAPPING [MSS_INDEX];
    }
return PS_INDEX;
}
```

Figure 6:
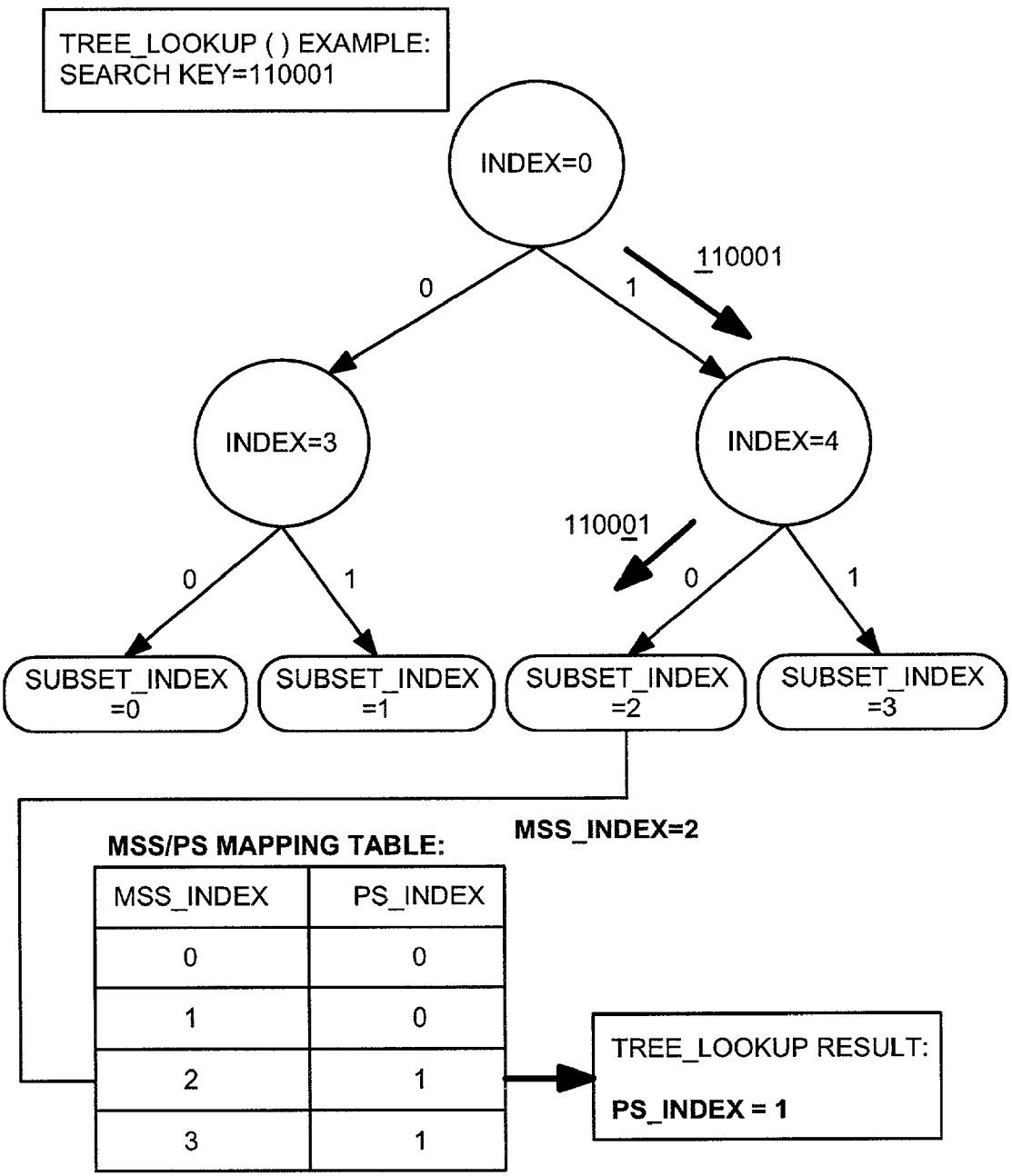
FIG. 6 is a schematic diagram illustrating an example of how a given target bit pattern can be used to traverse the Patricia tree of FIG. 4 to arrive at a relevant physical set.

As an example of the application of the Tree-lookup function, FIG. 6 schematically illustrates a traversal of the tree in FIG. 4 using the physical sets generated in FIG. 5. For this example, the target bit pattern is 110001. As can be seen, the traversal begins with index=0 meaning bit position=0. Since the target bit pattern has a value of '1' at this bit position then the '1' branch in FIG. 6 is taken. The next index value, and hence the next bit position is 4. Since the target bit pattern has a value of '0' at this bit position (as shown by the underlined value in the figure). This leads to the subset_index=2 or MSS_INDEX=2. This MSS_INDEX (as can be seen in FIG. 6) leads through the MSS/PS mapping index to a PS_INDEX (or physical set index) denoting physical set 1 or PS1.

From here, the physical set (PS1) can be retrieved and the mask matching method can be applied to the physical set using the target bit pattern.

Figure 7:
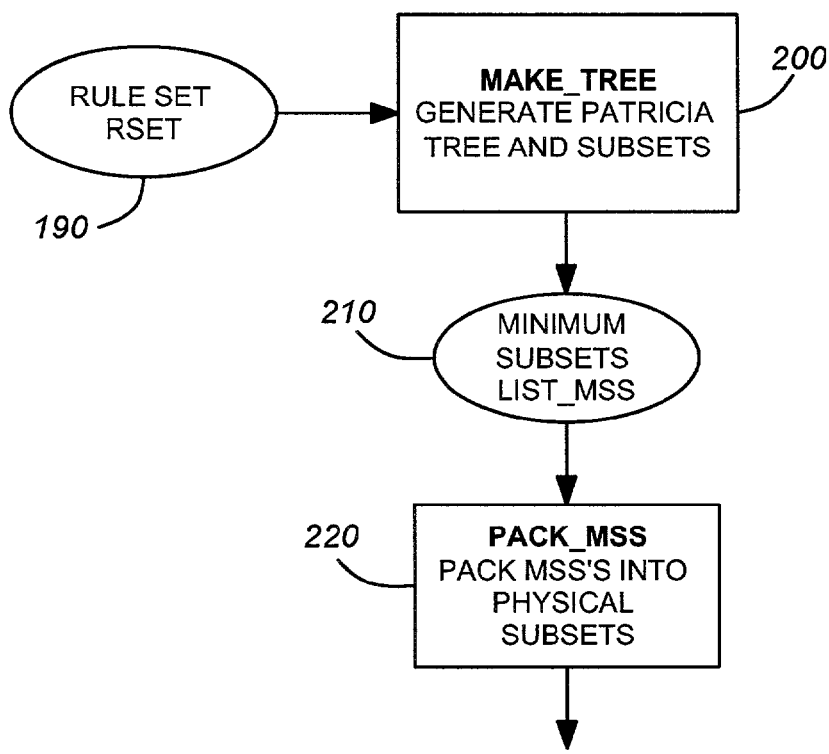
FIG. 7 is a high level flow chart detailing the steps in the creation of a Patricia tree and physical subsets.

To summarize the steps involved in the above process, FIG. 7 illustrates a flowchart detailing these general steps.

The initial phase starts with a rule set or a set of candidate bit patterns 190. A tree is then created from this rule set(step 200). The tree creation step essentially groups the candidate bit patterns into subsets based on their bit values at specific bit positioning. From this, the minimum subsets or the subgroups in FIG. 4 can be obtained (step 210). The subgroups can then be packed into physical sets (step 220).

Figure 8:
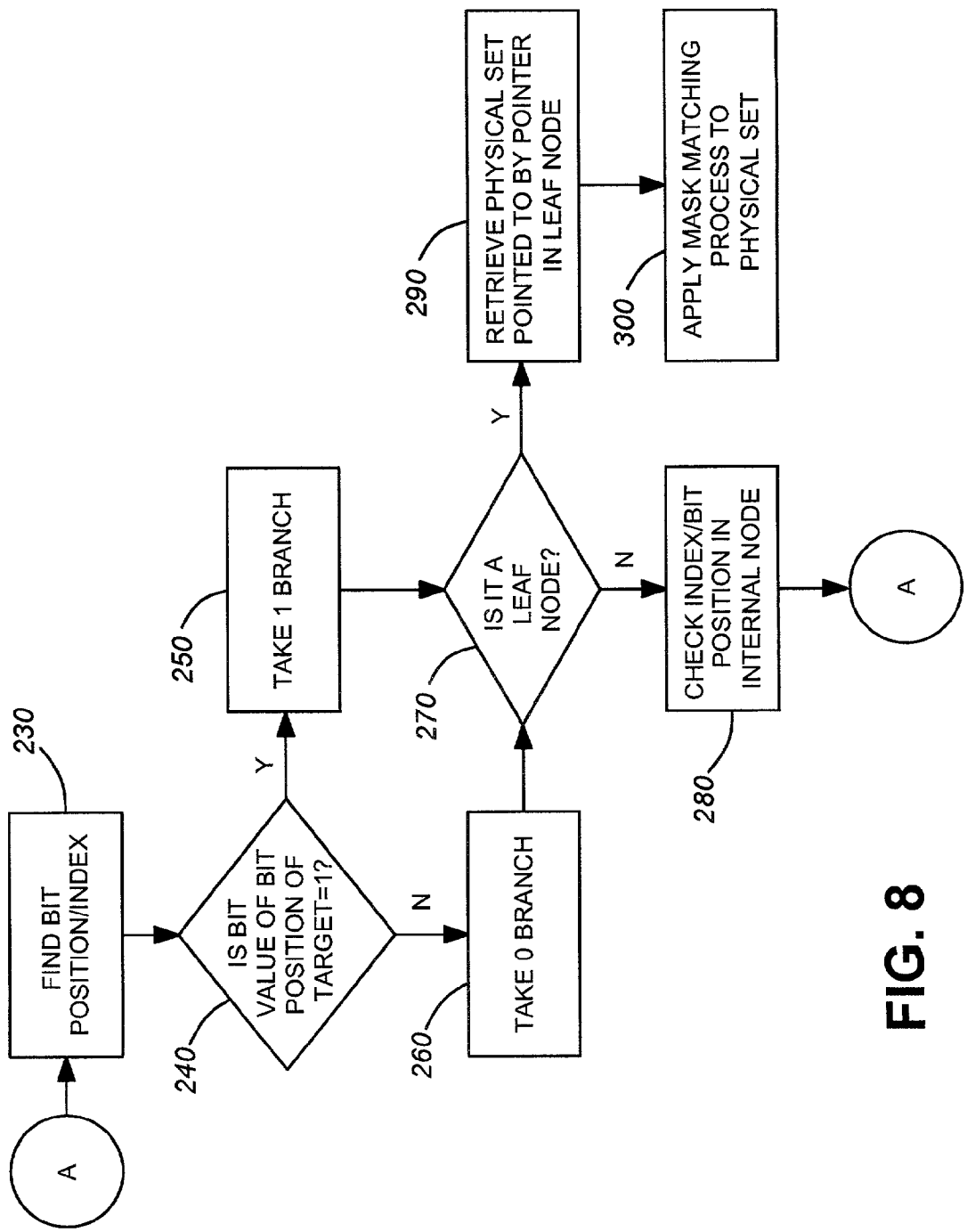
FIG. 8 is a flow chart detailing the steps in the traversal of a modified Patricia tree as shown in the example of FIG. 6.

With the physical sets created along with the tree, a given target bit pattern can thus be used to find a match. FIG. 8 illustrates the steps in this process.

As can be seen in FIG. 8, the process begins with determining the bit position/index at an internal node of the tree (step 230). Step 240 is that of determining if the bit value of the bit position referred to in the internal node has a value of 1. If so, then step 250 notes that the '1' branch has to be taken. If, on the other hand, the bit value equals '0' then the '0' branch is taken (step 260). Either way, 270 checks if the next node is a leaf node. If not, then the node must be an internal node and step 280 checks the index/bit position at that node. Then, connector A details jumping back to step 230. On the other hand, if the node found in step 270 is a leaf node, then the physical set pointed to by the leaf node is retrieved (step 290). The chosen mask matching method is the applied to this physical set to determine if a match exists or not (step 300).

The above description invention can be customized to work with any mask matching method. As an example, it can be customized with the applicant's other invention, the enhanced mask matching method (EMMM) as described in copending US application entitled MULTI-FIELD CLASSIFICATION USING ENHANCED MASKED MATCHING.

The EMMM breaks the target bit pattern and the candidate bit patterns into sets of s-bit-wide chunks. The number of chunks is W/s. For each chunk, a 3-dimensional partial match array for all the bit combinations in the chunk is precomputed. The partial match is represented by:

$M[N] [W/s][2^s]$

The partial match array M[k] [i] [j] represents the precomputed partial match result for all the bit combinations within the chunk, where i specifies the chunk index, j specifies an s-bit combination value, and k indexes the N-bit partial filter matching result.

For each chunk, the field bits are used to index into the 3-D partial match array to fetch the N-bit partial match result vector. The fetched partial match vector is then ANDed together for each chunk to form the complete match vector.

It should be noted that each bit in the match vector references a specific candidate bit pattern in the relevant physical set. If there are multiple matches in a physical set, priority encoding is used to resolve the conflict. Thus, it is important for this specific embodiment that the candidate bit patterns in the physical set be placed in their order of priority. This requirement will be made clear later in this document.

To generate the partial match array for EMMM, the following method detailed in C pseudo-code can be used:

```
GENERATE_EMM_ARRAY generate EMMM partial match array from LIST_PS.
Parameters:
NUM_PS          the number of PS's supported
KEY_WIDTH       the width of the search key
CHUNK_SIZE      the EMMM chunk size (speedup factor)
LIMIT           the maximum number of rules in each PS
LIST_PS [i] [j] the j-th rule in the i-th PS
M               the EMMM partial match array for LIST_PS
SUBROUTINE Match (x, y) // x is s-bit binary vector, y is s-bit
ternary vector
{
    result = 1;
    for (T=0; T<CHUNK SIZE ; t++)
    {
        switch (y[t])
        {
            case 'x' : p = 1; break;
            case '1' : p = (x[t] ==1); break;
            case '0' : p = (x[t] ==0); break;
        }
        result = result & p;
    }
    return result;
}
GENERATE_EMM_ARRAY (Set LIST_PS)
{
Boolean M{NUM_PS] [KEY_WIDTH/CHUNK_SIZE] [2^CHUNK_SIZE] [LIMIT];
Set LIST_PS;
Int ps_index, chunk_index, chunk_value, rule_index;
for (ps_index = 0; ps_index<NUM_PS; ps_index++)
    for (chunk_index=0; chunk_index<KEY_WIDTH/CHUNK_SIZE;
    chunk_index ++)// the chunk
        for (chunk_val=0; chunk_val<2^s ; chunk_val++)
        // enumerate bit combinations in a chunk
            for (rule_index=0; rule_index<LIMIT; rule_index++)
            M[ps_index] [chunk_index] [chunk_val]rule_index] =
            Match (chunk_val,
                LIST_PS [ps_index] [rule_index] [chunk_index*
                (CHUNK_SIZE+1) s-1:chunkindexi*CHUNK_SIZE]);
}
```

Figure 9:
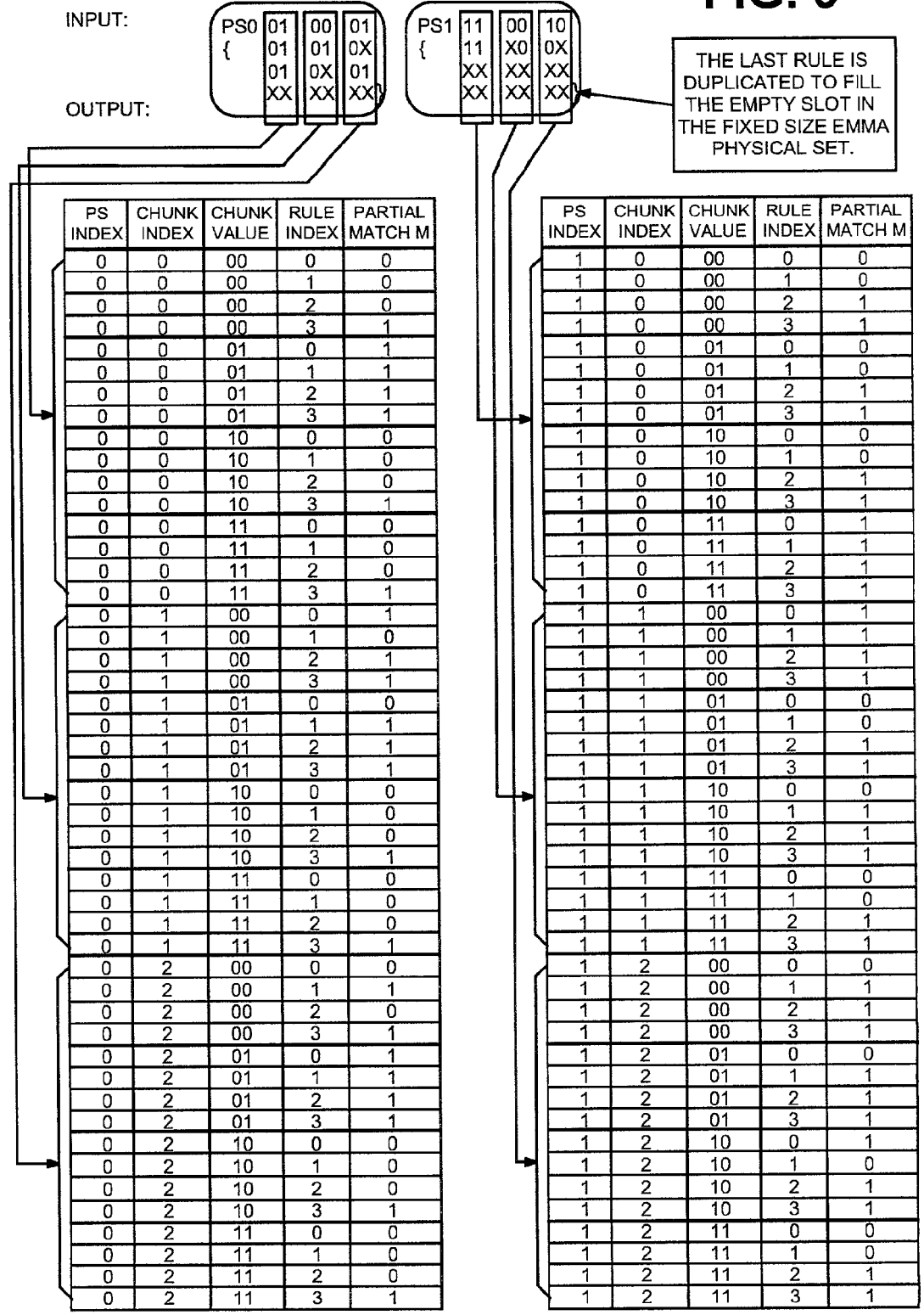
FIG. 9 is an illustration of the lookup tables generated for the EMMM process.

As an example of the application of the above method, FIG. 9 illustrates a partial match array for the physical sets generated in FIG. 5. As can be seen, the candidate bit patterns in physical sets PS0 and PS1 are "chunked" into chunks that are 2 bits wide. Each chunk is indexed as 0, 1, or 2, depending on their placement in the bit pattern. Since the value of LIMIT is 4, to have a full physical set, the last rule/candidate bit pattern in the set is duplicated to fill the set. Since the rules/bit patterns are in their order of priority (i.e. the highest priority rule is at the top) then it is the lowest priority rule/bit pattern that is duplicated.

It should be noted that in the tables of FIG. 9, the rules in the physical sets are also indexed as 0, 1, 2, 3, along with the physical set and the chunk. Thus, for PS_INDEX=0, chunk index=1, and rule index=2, one needs to examine the physical set-PS0, the $3^{rd}$ rule in the physical set (bit pattern 010x01 since indexing begins at index=0) and the second chunk of 0x.

To generate the tables in FIG. 9, all possible bit combinations for a given chunk size is generated and each bit combination is compared with the relevant chunk of the bit pattern. If there is a match between the bit combinations and the chunk, a '1' is entered in the partial match vector for that chunk index. The partial match vector is the final column in the tables of FIG. 9. As an example, in FIG. 9 the chunk size equals 2 and this means 4 possible bit combinations (00, 01, 10, 11). For chunk index 0, physical index 0, there are 16 entries—one for every correlation between the 4 bit combinations and the 4 rule chunks. Thus, for chunk value 01 (bit combination 01) in the chunk index 0 (first chunk) of physical set 0 PS0 and rule index 2 (3rd rule in PS0 the rule chunk has a value of 0x, compared with the chunk value of 01, there is a match and, accordingly, a '1' is entered into the partial match vector.

A similar process is used when the table relating to the second physical set (PS_index=1) is created.

Figure 10:
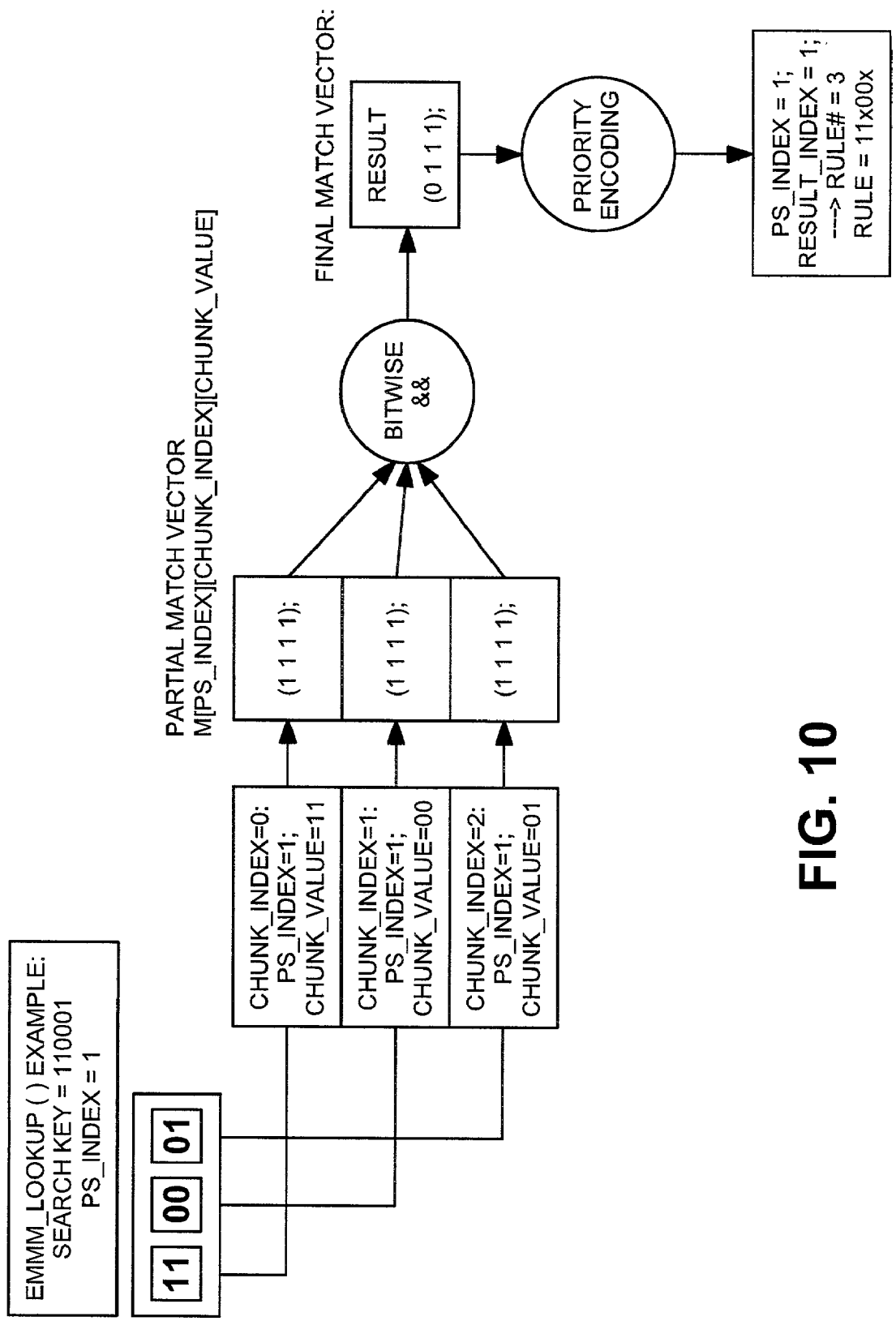
FIG. 10 is a schematic illustrating an example of an implementation of the EMMM process in conjunction with the modified Patricia tree traversal.

Once the tables are created and the tree is traversed, the target bit pattern can be matched with the physical set members using EMMM. This can be done by applying the following C pseudo-code:

As can be seen in FIG. 10, the target bit pattern is chunked into 3 chunks: 11, 00, and 01, each chunk being indexed independently. From the tree traversal example in FIG. 6, the target bit pattern 11 00 01 is to be associated with physical set PS1 (PS_INDEX=1) for a possible match. As shown in FIG. 10, each chunk of the target bit pattern is independently matched with the relevant potion of the physical set tables in FIG. 9 to determine the practical match vector.

To explain this process, the first chunk of the target bit pattern (CHUNK_INDEX=0) can be used as an example. Given that (from FIG. 10)
CHUNK_INDEX=1
PS_INDEX=1
CHUNK_VALUE=1 then, from the PS1 table of FIG. 9, the partial match vector for the chunk and its values has a value of (1 1 1 1). Similarly, the partial match vectors for the other chunks are found. To duplicate the data in FIG. 10, the values for the other chunks and then partial match vectors are:
CHUNK_INDEX=1
PS_INDEX=1
CHUNK_VALUE=00
   Partial match vector=(1 1 1 1)
CHUNK_INDEX=2
PS_INDEX=1
CHUNK_VALUE=01
   Partial match vector=(0 1 1 1)

These partial match vectors are then ANDed together in a bitwise manner to give the final match vector. To illustrate this:

| Partial match vectors | | | Final Match Vector |
|---|---|---|---|
| 1 | 1 | 0 | 0 |
| 1 | 1 | 1 | 1 |
| 1 & | 1 & | 1 → | 1 |
| 1 | 1 | 1 | 1 |
| 1 | 1 | 1 | 1 |

```
EMMM_LOOKUP (PS_INDEX, Key)
{
Boolean M[NUM_PS] [KEY_WIDTH/CHUNK_SIZE] [2^CHUNK_SIZE] [LIMIT]; // the
EMMM array
Boolean result [LIMIT];
Int chunk_index, chunk_value, rule_index;
int class_index;
for (rule_indes=0; rule_index <LIMIT; rule_index++) // set result
vector to 11...1
    result {rule_index] = 1;
// calculate the match vector
for (chunk_index=0; chunk_index < KEY_WIDTH/CHUNK_SIZE; chunk_index
++) // the chunk
    for (chunk_val=0; chunk_val<2^CHUNK_SIZE; chunk_val++) //
    enumerate bit combinations in a chunk
        for (rule_index=0; rule_index<LIMIT; rule_index++)
            result [rule_index] = result [rule_index] &
            M[ps_index] [chunk_index] [chunk_val] [rule_index];
// do priority encoding on result [rule_index];
for (rule_index=0; rule_index<LIMIT; rule+index++)
    if (result (rule_index)) break;
class_index = rule_index;
return class_index;
}
```

An example of this application is illustrated in FIG. 10. This example uses the same target bit pattern used in traversing the tree in FIG. 6.

The final match vector denotes that there is a match in rows 1, 2, and 3 of physical set PS1 (PS_INDEX=1)for the target bit pattern 11 00 01. It also denotes that there is not a match between the target bit pattern and the candidate bit pattern in row 0 of the physical set PS1.

To determine which of these matching candidate bit pattern must take precedence, priority between these matching bit patterns must be determined. As noted in the beginning, the priority in the rule set is determined by the order of the bit patterns in the rule set. Thus candidate bit pattern 0 in the rule set has the highest priority. In the physical sets the bit patterns are also in order of priority. Thus, the candidate bit pattern in row 1 of physical set PS1 has the highest priority. For this reason, the result index in FIG. 10 is given as 1. If the matching bit pattern with the highest priority were in position 2, then the result index would equal 2. With result_index=1, this corresponds to rule 3 in the rule set. Clearly, when the rules in the rule set are placed in the physical sets, the rules' ranking or placement in the original rule set is noted. The matching bit pattern is therefore determined to be rule 3 in the original rule set.

Figure 11:
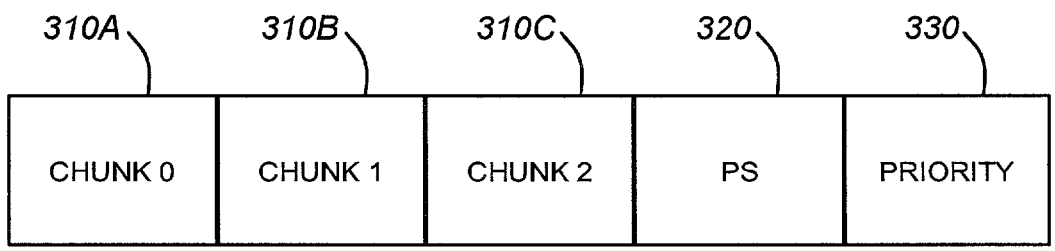
FIG. 11 is a block diagram illustrating a possible format for a physical set entry necessary to implement priority indexing.

It should be noted that while the above uses a rule's positioning in the physical set and in the rule set to determine priority, a priority indexing system may be used to eliminate the need for priority placement. A physical set entry may have the format given in FIG. 11 to implement priority indexing. The system in FIG. 11 assumes a 6 bit pattern and 2 bit chunks of the candidate bit pattern while position 330 would contain a priority index. If there are multiple matches in a physical set, the priority index would determine priority—a higher priority index denoting either higher or lower priority. Priority encoding would therefore be simpler, albeit at the cost of a few bits per entry. The few bits per entry can be saved by simply ordering the entries in order of priority, albeit at the cost of more logic when placing the entries in the physical set.

With regard to implementing the method described above in hardware, FIG. 12 illustrates a block diagram showing the different parts of a possible hardware embodiment. To explain FIG. 12, a search key 230 is fed into a Patricia tree search engine 240 and a multiplexer 250. Coupled to the Patricia tree search engine is a RAM bank 260 which contains the Patricia tree data structure. The multiplexer 250 has an output that is received by a merge bus 270. Also being input into the merge bus 270 is the output of the Patricia tree search engine 240. The Patricia tree search engine 240 outputs a PS_index which indicates which physical index is being referenced along with the two bit output of the multiplexer 250. Also input into the merge bus 270 is the output of a sequencer 280. The output of the merge bus 270 is a 20 bit address that is fed into the EMMM array in memory or RAM 290. The output of this array 290 is fed into D flip-flops 300 by way of AND gate 310. The other input of the AND gate 310 is the output of the OR gate 320. OR gate 320 has two inputs, one from a priority encoder 330, and the other from the sequencer 280. The output of the priority encoder 330 is fed into a lookup table 340 along with the PS_index or physical set index from the Patricia tree search engine. The ultimate output of the lookup table 340 is the matching bit pattern.

Figure 12:
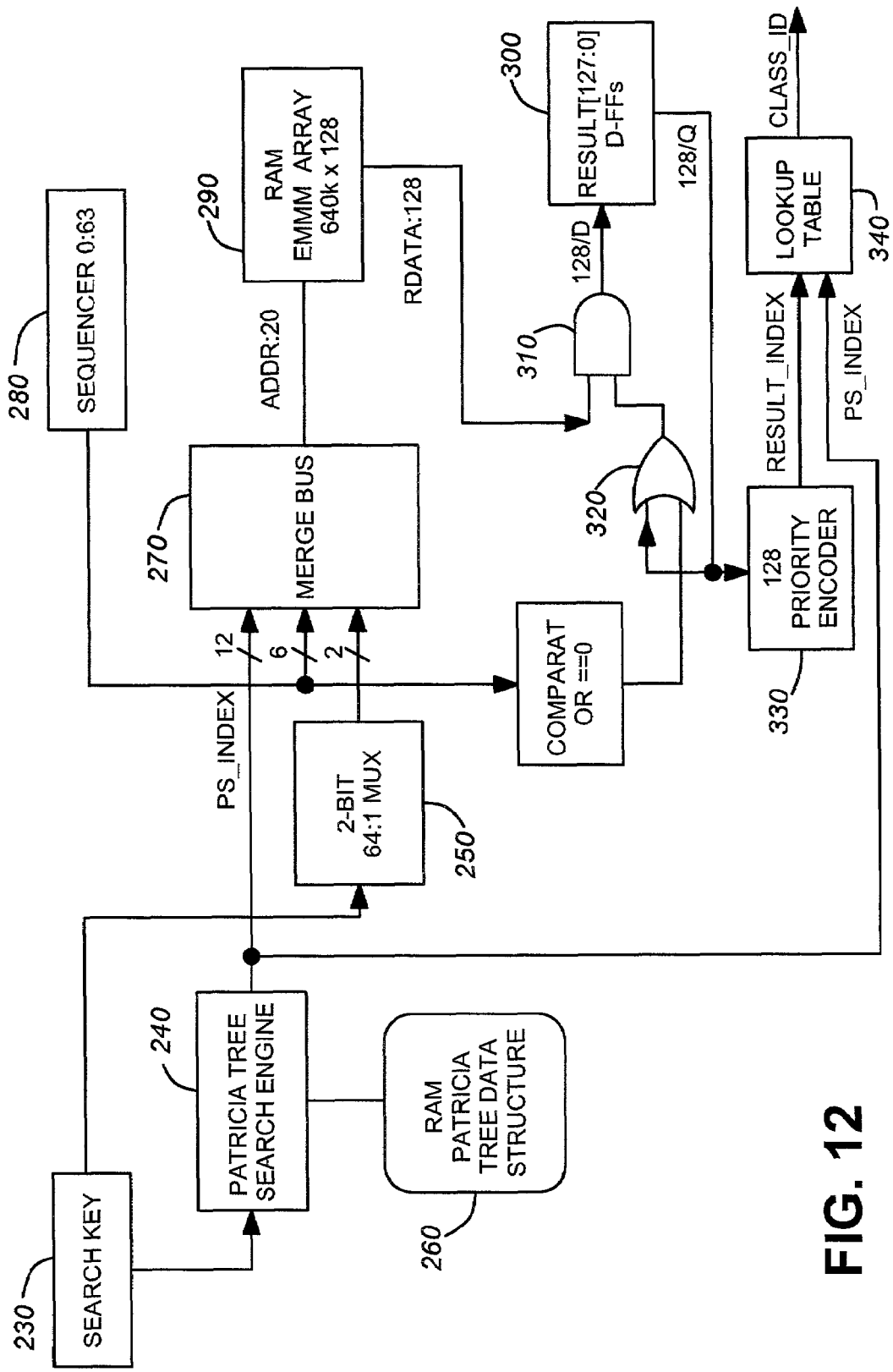
FIG. 12 is a block diagram showing the different parts of a possible hardware embodiment of the invention.

The block diagram of FIG. 12 has essentially two major components. The first is the Patricia tree component comprising the Patricia tree search engine 240 and the memory 260 containing the Patricia tree data structure. The second component is composed of the hardware search engine 290 implementing the EMMM method as outlined above and disclosed in the applicant's application entitled MULTI-FIELD CLASSIFICATION USING ENHANCED MASKED MATCHING. The physical set index from the Patricia tree search engine is sent to the merge bus 270 and in conjunction with the two bit output of the multiplexer 250 which determines the chunks to be examined. The merge bus takes the physical set index and the chunk to be examined along with the sequencer output which determines which chunk of the search key is to be looked up and combines all this into a 20 bit address that references the memory 290 containing the EMMM array as described above. The output of this memory 290 is sent to the AND gate 310 for storage and D flip-flops 300. Essentially, the AND gate 310 D-flip-flops 300 and the OR gate 320 perform a running AND operation on the results of the lookup for the EMMM array. As can be seen in FIG. 12 the output of the D flip-flops 300 is also fed into the priority encoder 330. Once all the results from the EMMM array 290 have been processed by the loop defined by AND gate 310, D flip-flops 300,and OR gate 320, the priority encoder determines from the match vector which of the matching bit patterns has priority over the others. The result of the priority encoder, a result_index, is then sent to the lookup table 340 along with the physical set index from the Patricia tree search engine and based on these two pieces of data, the final matching bit pattern is found from the look up table.

In terms of the performance of the combined EMMM method and the Patricia tree pruning as outlined above, the following is an analysis of their performance and cost in terms of hardware. In the wild-card Patricia tree, because of the pruning process defined by the Make_tree algorithm, the two subsets representing the child nodes of any internal node must have at least one uncommon element. Hence any leaf node of a wildcard Patricia tree has at least one unique element that does not belong to the remaining leaf nodes. Therefore:

Number of PS's≦Number of Leaf Nodes (number of MSS's)≦Number of rules in the full set. Also because the Patricia tree is a binary tree we know:

Number of Internal Nodes≦(Number of Leaf nodes−1);

Because the bit index of the descendant nodes is greater than the parent node and the bit_index value is smaller than the width of the key, then Depth of Patricia tree≦KEY_WIDTH+1.

Memory cost for Patricia tree:

Patricia_tree_size=Number of internal nodes+Number of Leaf Nodes<=2*Number_of rules-1;

Worst case computation cost of Patricia Tree Lookup:

Tree_Lookup_step=Depth of Patricia Tree—1≦ KEY_WIDTH;

Each tree lookup step consists of one memory access to fetch the tree node and a logical comparison.

EMMM array memory cost=NUM_PS×KEY_WIDTH/CHUNK×$2^{CHUNK\_SIZE}$×LIMIT;

Memory bandwidth (bits per lookup)=KEY_WIDTH/CHUNK SIZE×LIMIT;

The parameter NUM_PS should be chosen according to the maximum rule set size and the LIMIT. Because of the overlapping of rules among the PS's, the following equation should be satisfied:

NUM_PS×LIMIT×(1-overlapping_factor)>NUM_RULES hence:

NUM_PS=NUM_RULES/LIMIT/(1-overlapping_factor);

The following table gives a set of assumptions on possible system parameters:

| Name | Value | Comments |
|---|---|---|
| NUM RULES | 256K | |
| LIMIT | 128 | |
| CHUNK_SIZE | 2 | |
| KEY_WIDTH | 128 | |
| Overlapping_factor | 20% | |

The Memory cost estimation

| Name | Value | Comments |
|---|---|---|
| NUM_PS | 256k/128/(1−20%)=2560 | |
| Internal Nodes | 43×256K=11 Mb | 7 bits for bit_index + 18 bits per pointer × 2 = 43-bit |
| Leaf Nodes | 12×256 K = 3.0 Mb | 12-bits for PS index (addressing a space of 4096 PS's) |
| EMMM_ARRAY | 2560×128/2×4×128=80Mb | |

The Memory bandwidth cost (per lookup)

| Name | Value | Comments |
|---|---|---|
| Number of internal node access | 128 × 43 = 5504 | fetch internal node record each record is 43-bit wide |
| Number of leaf node access | 1 × 12 = 12 | fetch leaf node record each record is 11-bit wide |
| Number of EMMM accesses | KEY_WIDTH/CHUNK_SIZE = 128/2 = 64 × 128 = 8192 | Each time fetch a 128-bit wide partial match vector |
| Total memory bw | 13708bits/lookup | |

At OC_rates, the classifier needs to have a throughput of 6M lookups per second. This translates into 6M×13708-82 Gbps memory bandwidth. At a 200 MHz clock frequency, the required raw memory bandwidth can be achieved using a 410-bit wide memory bus. The actual design can be optimized by using a mixture of embedded SRAM, embedded DRAM, and off-chip DRAM/SRAM.

A person understanding the above-described invention may now conceive of alternative designs, using the principles described herein. All such designs which fall within the scope of the claims appended hereto are considered to be part of the present invention.

I claim:

1. A method of increasing the efficiency of a process for finding a match between a target bit pattern and at least one of a plurality of candidate bit patterns, the method comprising:

a) dividing said candidate bit patterns into specific groups such that for every group, members of that group have bit agreement with every other member in said group;

b) applying said process only to groups whose members have bit agreement with said target bit pattern; and wherein said dividing is accomplished by:

a1) defining a working bit position;

a2) grouping said candidate bit patterns based on bit values at said bit position such that for every group all members in that group have the same bit value at said bit position;

a3) defining a new working bit position;

a4) applying step a1)–a3) to every group such that members of resulting subgroups have bit agreement at all bit positions up to the new working bit position; and a5) applying steps a2)–a4) to all resulting subgroups such that final resulting subgroups have bit agreement at all bit positions, wherein each new working bit position is subsequent to its preceding working bit position.

2. A method of increasing the efficiency of a process for finding a match between a target bit pattern and at least one of a plurality of candidate bit patterns, the method comprising:

a) dividing said candidate bit pattern into search space groups, each group having an aggregate number of members lesser that the total aggregate number of candidate bit patterns;

b) applying said process only to groups whose members are in bit agreement with the target bit pattern on at least a first bit position; and wherein said dividing is accomplished by:

a1) defining a working bit position;

a2) grouping said candidate bit patterns based on bit values at said bit position such that for every group all members in that group have the same bit value at said bit position;

a3) defining a new working bit position;

a4) applying steps a1)–a3) to every group such that members of resulting subgroups have bit agreement at all bit positions up to the new working bit position; and a5) applying steps a2)–a4) to all resulting subgroups such that final resulting subgroups have bit agreement at all bit positions, wherein each new working bit position is subsequent to its preceding working bit position.

3. A method of increasing the efficiency of a process for finding a match between a target bit pattern and at least one of a plurality of candidate bit patterns, the method comprising:

a) grouping said candidate bit patterns based on a value of a specific bit in a specific bit position in said candidate bit patterns;

b) discarding candidate bit patterns which have a specific bit in a specific bit position whose value does not match the value of the corresponding bit in the target bit pattern;

c) repeating steps a)–b) to the remaining candidate bit patterns with different bit positions until the number of remaining candidate bit patterns is at a minimum; and d) applying said process to the remaining candidate bit patterns.

4. A system for matching a target bit pattern with at least one of a plurality of candidate bit patterns, the system comprising:

dividing means for dividing said candidate bit patterns into specific groups such that for every group, members of that group have bit agreement with every other member in said group;

mask matching means for matching said target bit pattern with at least one of said candidate bit patterns, said mask matching means including being applied only to groups whose members are in bit agreement with the target bit pattern on at least a first bit position; and wherein said dividing means executes the following method;

a1) defining a new working bit position;

a2) grouping said candidate bit patterns based on bit values at said bit position such that for every group all members in that group have the same bit value at said bit position;

a3) defining a new working bit position;

a4) applying steps a1)–a3) to every group such that members of resulting subgroups gave bit agreement at all bit positions up to the new working bit position; and a5) applying steps a2)–a4) to all resulting subgroups such that final resulting subgroups have bit agreement at all bit positions, wherein each new working bit position is subsequent to its preceding working bit position.

5. Computer readable media having encoded thereon computer readable and computer executable code for executing a method for increasing the efficiency of a process for finding a match between a target bit pattern and at least one of a plurality of given candidate bit patterns, said method comprising;

a) grouping said candidate bit patterns based on a value of a specific bit in a specific bit position in said candidate bit patterns;

b) discarding candidate bit patterns which have a specific bit in the specific bit position whose value does not match the value of the corresponding bit in the target bit pattern;

c) repeating steps a)–b) to the remaining candidate bit patterns with different bit positions until the number of remaining candidate bit patterns is at a minimum; and d) applying said process to the remaining candidate bit patterns.

\* \* \* \* \*